United States Patent [19]

Tate et al.

[11] 3,831,012

[45] Aug. 20, 1974

[54] NORMALIZE SHIFT COUNT NETWORK

[75] Inventors: Donald P. Tate, St. Paul; Daniel J. Desmonds, Roseville, both of Minn.

[73] Assignee: Control Data Corporation, Minneapolis, Minn.

[22] Filed: Mar. 28, 1973

[21] Appl. No.: 345,613

[52] U.S. Cl. ............ 235/164, 235/152, 340/172.5
[51] Int. Cl. ............ G06f 7/38
[58] Field of Search ........... 235/164, 156, 175, 168, 235/152; 340/172.5

[56] References Cited

UNITED STATES PATENTS

| | | | |
|---|---|---|---|
| 3,043,509 | 7/1962 | Brown et al. | 235/156 |
| 3,193,669 | 7/1965 | Voltin | 235/164 |
| 3,678,259 | 7/1972 | Kyser | 235/156 |

*Primary Examiner*—Malcolm A. Morrison
*Assistant Examiner*—David H. Malzahn
*Attorney, Agent, or Firm*—William J. McGinnis, Jr.; Joseph A. Genovese

[57] ABSTRACT

In a digital computer, a normalize shift count network is provided which operates on either positive or negative operands stored in a register. The shift count network operates in either a regular mode or a double operand mode where each of the two operands is one-half the regular width operand to produce as a result operand or operands the number of register positions the input operand or operands must be shifted in order to produce normalized operands.

Initially the operand is examined by a rank of Exclusive OR circuits arranged so that, generally, each bit of the operand forms one input to two adjacent exclusive OR circuits and so that each exclusive OR circuit, in turn, receives its two independent input quantities from adjacent bits of the operand. The upper bit of the operand is the sign bit and forms one input to a first exclusive OR circuit. The sign bit also forms one input into a second exclusive OR circuit which has as its other input the first significant bit of the operand. The exclusive OR circuits determine where the first significant bit of the operand is located by the comparison of the first bit of the numerical portion of the operand with the sign bit and by subsequent comparison of each bit with the preceeding bit. The shift count for this first significant bit is decoded by examining the outputs of the exclusive OR circuits in a plurality of independent predetermined groups to independently define the individual bit values in a binary number expressing their required shift count for normalization.

4 Claims, 2 Drawing Figures

NORMALIZE SHIFT COUNT NETWORK

BACKGROUND OF THE INVENTION

This invention relates to the provision of a normalize shift count network for use in a digital computer which will operate on either positive or negative numbers to produce a number corresponding to the number of bit positions that the operand must be shifted in order to bring the most significant bit of the operand into position adjacent the sign bit of the operand. The network can operate on either a full width operand or two one-half width operands.

Generally, in computers the left-most bit in a given register is a sign bit and all the bits to the right of the sign bit, also called the lower bits in the register, represent the operand itself. Customarily, the sign bit of a number is a zero if the number is a positive number. Binary ones indicate the presence of powers of two and zeros indicate the absence of powers of two in the corresponding position in the register. If a positive sign number is smaller than the capacity of the register in which it is held, the sign bit at the left-most position in the register will be followed by a succession of zeros until the first significant bit or one of the operand occurs.

In many arithmetic operations occurring in the computer it is desirable to have the operands normalized. However, this presents two distinct problems. With positive numbers normalization may be analyzed as a determination of the first position after the sign bit where there is a boundary between a zero and a one in a binary number. With a negative number where the sign bit is a one and the leading nonsignificant digits in the register are ones rather than zeros, the problem becomes that of determining where the first boundary between a one and a zero occurs in the binary number. It is recognized that the problem may be defined as one of finding the first bit position in a register where the operand changes from a plurality of like digits all of which are like the sign bit to the first bit which is unlike the sign bit.

However, prior art normalize shift count networks are designed for positive numbers and require that the negative number be complemented prior to normalization. This means that the computer would have to perform an additional logic step for negative numbers that would not have to be performed for positive numbers. This additional logic step would therefore require additional time for normalizing the negative number over the time required for positive numbers. This would be an insurmountable drawback in a computer design for what is known as pipeline where a continuous stream of operands are placed into the arithmetic section of the computer and in which the same sequence of operations is performed on all operands. The workability of a pipeline system requires that all operands be manipulated in exactly the same length of time so that an uninterrupted flow rate of operands into and out of a given arithmetic section may occur.

One solution to the problem would be that of complementing negative numbers before inputting them to the normalize network designed for positive operation. However, this would require substantial additional logic for controlling the timing of the complement function and the supplying of complemented numbers to the normalizer. A further problem that requires substantial additional circuitry and at least an additional logic level for relatively long binary operands is that of fan out or extension of the sign bit of the operands throughout the entire length of the complement network so that the portion of the complement network operating on each bit has available to it the sign of the number to determine whether the number should pass through unchanged or should be complemented.

Thus it is desirable to provide a normalize shift count network for both positive and negative operands suitable for use in a pipeline computer. Also, it is desirable to provide a normalize network for use with large operands but which may efficiently be used to handle a greater number of smaller operands than larger operands.

SUMMARY OF THE INVENTION

A normalize shift count network is provided which may be used in a pipeline computer for operating on a continuous stream of operands. The shift count network determines the number of place positions a binary operand must be shifted in a register in order to place a most significant bit of either a positive or negative operand adjacent the sign bit. Some computers simply left shift the operand to accomplish this. Other computers perform an end-around, right-shift to accomplish the same result. The present invention may be used for a computer operating in either way.

In addition, the present invention may be used in a form permitting two operands to be operated on simultaneously where the shift count network is in effect split in half for two operands of one-half the normal operand size. This is of great advantage when used in a pipeline type of computer, since the same hardware can handle one stream of relatively large numbers or two streams of smaller numbers. This provides great versatility, since a powerful computer must be prepared to conveniently handle a stream of relatively large numbers in a scientific application. For example, even where its typical computing task may be smaller numbers, the large number capacity must be present. In the event of comparatively small numbers, the present computer can handle two streams of operands.

In the form of the invention shown herein, the operand or operands, including sign bit, are received by a rank of exclusive OR circuits. The first exclusive OR has as its input an internal bias or control signal and the sign bit of the operand. The second exclusive OR has as its inputs the sign bit and the first or highest order bit from the operand. In this context the highest order bit from the operand is dictated by the width of the data trunks and the registers used in the computer system and is to be distinguished from the most significant bit of the operand currently in the system. Throughout the rank of exclusive OR circuits, each exclusive OR receives two independent inputs, one from an associated bit of the operand and one from the next highest bit of the operand. The output of an exclusive OR is a "one" or positive only when the two inputs are different. Consequently, the first or highest order exclusive OR having a positive output indicates the first significant digit of the operand since it is the first exclusive OR having differing inputs.

Depending upon the width of the operands used in connection with a given embodiment of the normalize shift count network, the number of bits required to express a shift count equivalent to the entire width of the operand will vary. In the form of the invention shown herein, the network is shown in two halves each having an operand width of 24 bits thereby requiring a six bit shift count output capability for the system when operating on full width, 48 bit operands. Each bit of the shift count output is determined independently by a logic tree which examines the output of the rank of exclusive OR circuits. The logic tree looks at the highest order one bit indicating the most significant bit of the operand and from this bit position determines independently for the bit of the shift count which is assigned to the given logic tree whether or not a one bit in the result produced by rank of exclusive ORs will then require a one bit in the shift count output as a result. There are of course many ways to logically accomplish this function, one of which is shown here but all of which would operate on the same logical approach. IN THE FIGURES:

DESCRIPTION OF THE PREFERRED EMBODIMENT

Figure 1:
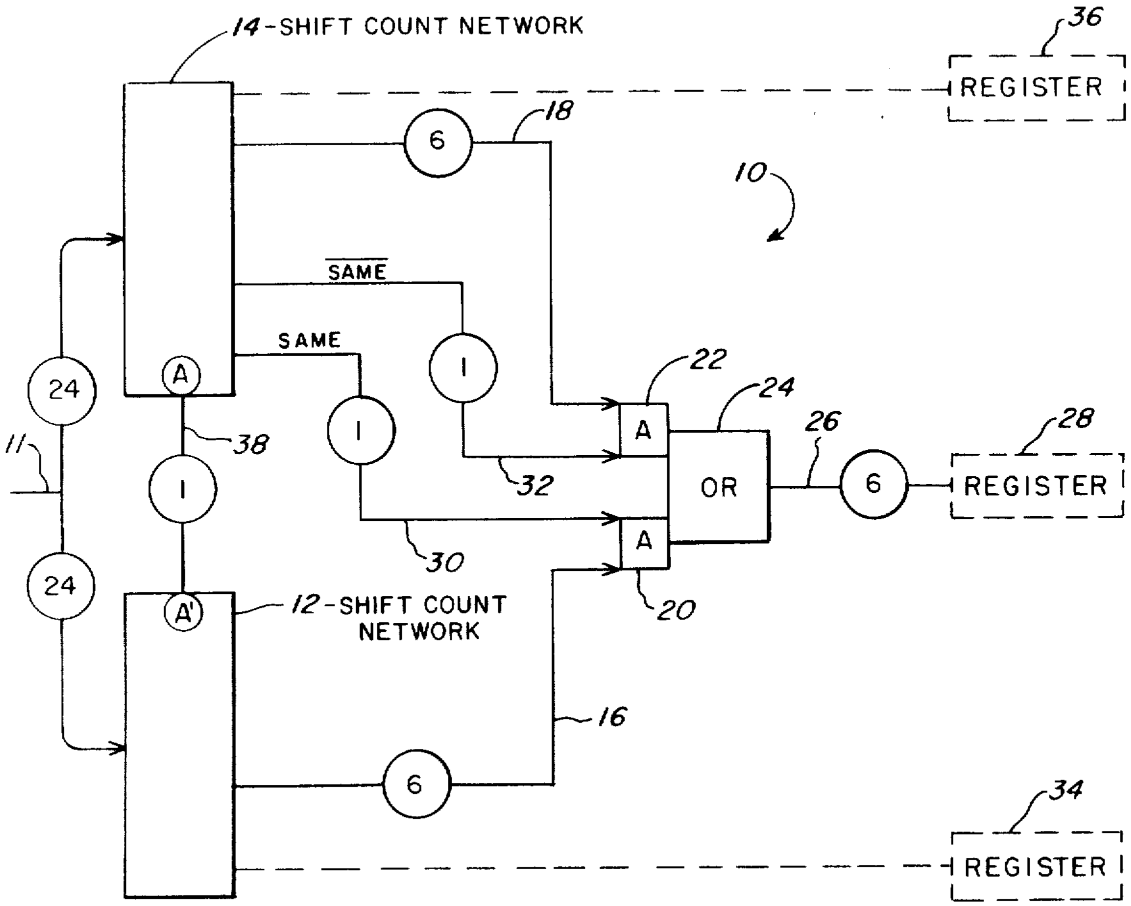
FIG. 1 is a block diagram of a network according to the present invention.
Figure 2:
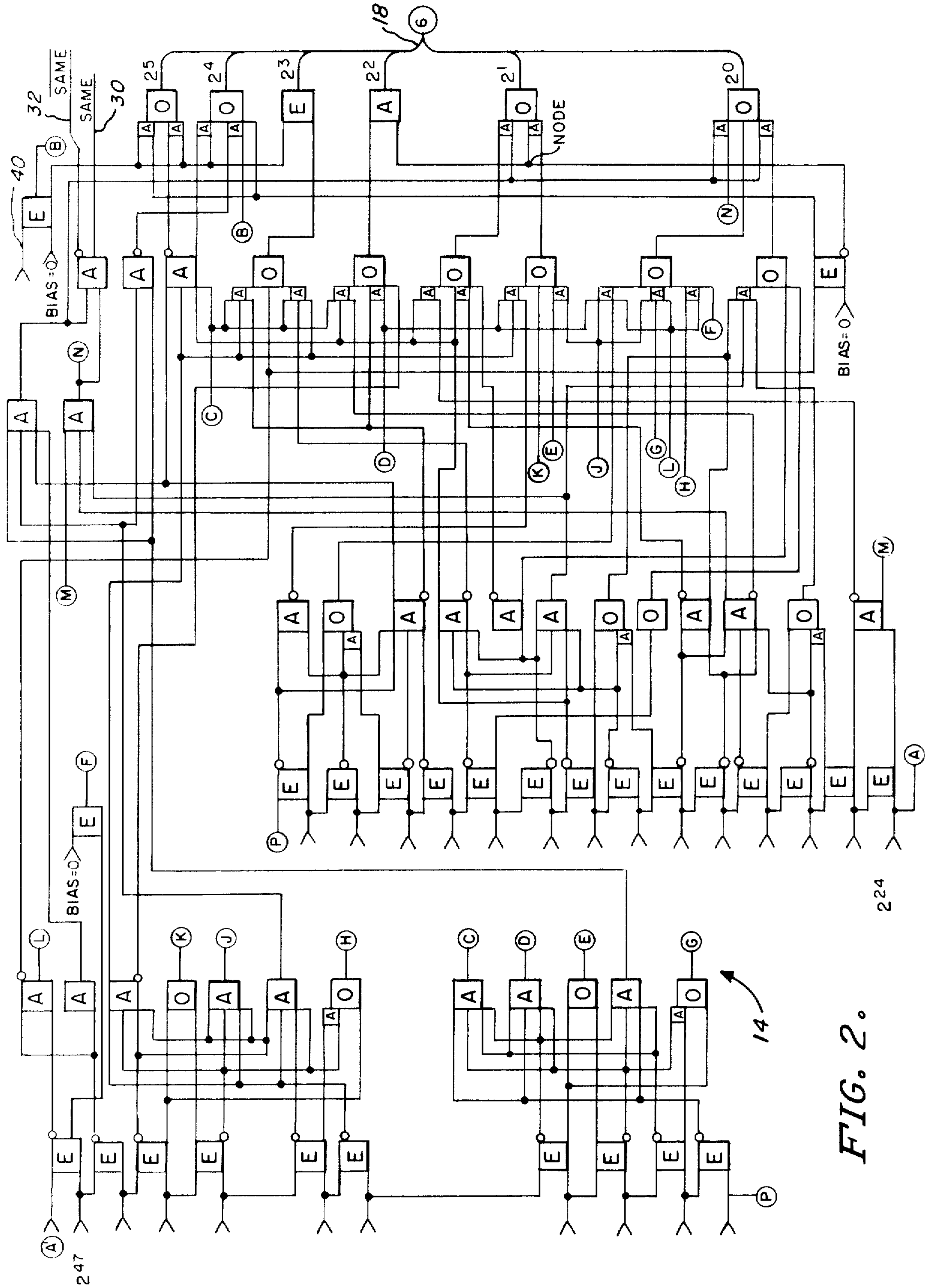
FIG. 2 is a detailed schematic of one of two identical blocks 12 and 14 shown in FIG. 1.

As shown in FIG. 1, the normalize shift count network 10 of the present invention consists of two identical sections, 12 and 14, one of which is shown in detail in FIG. 2. The input to network 10 consists of a data trunk 11 which in this example of the invention is a 48 bit data trunk. Twenty four bits of this data trunk, comprising $2^0$ through $2^{23}$ in the 48 bit operand, are input to section 12 while the remaining twenty four bits comprising $2^{24}$ through $2^{47}$ are input to section 14. The data trunk capacities are the circled numbers inserted in the data trunks. Sections 12 and 14 each produce, in this embodiment of the invention, a 6 bit shift count output, connected by data trunks 16 and 18, respectively, to AND gates 20 and 22, respectively. The AND gates 20 and 22 are connected to an OR gate 24 which is in turn connected by a 6 bit wide data trunk 26 to, for example, a shift count register 28, which holds the output of the network.

The AND gates 20 and 22 receive the shiftcount outputs from sections 12 and 14 as well as a "SAME" output 30 and "SAME" output 32 from section 14. Section 12 may have the "SAME" and "SAME" outputs as shown in FIG. 2, but they are not used. When full width operands are received, the shift count for the entire operand is taken from one section or the other. If all the input bits to section 14 are the same, then the most significant bit, from which the shift count is determined, is in section 12 which received bits $2^0$ through $2^{23}$. Thus AND gate 20 is activated to pass the shift count to register 28 because there is no meaning to the count appearing from section 14. However, if the bits supplied to section 14 are not all the same, then the "SAME" output 32 activates AND gate 22 so that the shift count from section 14 is transferred to register 28, since the most significant bit of the operand is clearly in one of the bit positions from $2^{24}$ through $2^{47}$.

If instead of one full width operand, there are two half width operands, the shift counts for each section is transferred independently to shift count registers 34 and 36, shown in dotted lines for ease of illustration. Of course with obvious logic circuits, only one additional register would be needed in the two operand mode by using register 28 to serve a dual purpose. As another alternative the shift count outputs from networks 12 and 14 could be supplied to register 28 and removed sequentially depending on the arrangement of the rest of the computer which need not be shown here.

Referring now to FIG. 2 one section is shown which may be either used as either section 12 or 14 depending on the connections made to the section. For purposes of illustration, the section is described as section 14. The shift count output 18 is shown on the right side of the figure. The inputs to the section are denoted by the symbol > from $2^{24}$ through $2^{47}$. The inputs are all to Exclusive OR circuits uniformly identified in the figure as a square containing a capital E. The boolean logic notation for each of the Exclusive ORs is AB + AB. AND gates in FIG. 2 are denoted by a capital A and OR gate by a capital O. The not (not A = A) output on the logic elements is denoted by a small circle at the square denoting the logic element. Interconnections within the figure are denoted by interconnecting similarly lettered circles in connections with logic elements. The small squares on the left, or input side, of logic elements are also AND gates, as denoted by a capital A. The encircled A and A' symbols in FIGS. 1 and 2 are not connected together in a single section but are connected between sections as shown at 38 in FIG. 1.

In section 14 shown in FIG. 2 the encircled A' symbol shows the input connection which receives the internal bias signal which is set equal to the operand sign bit, while the encircled A symbol is connected with the A' connection of section 12.

Referring again to FIG. 2 all input operand bits are supplied to Exclusive OR logic elements which are coupled to one another so that each bit determines one of the two inputs for each of two adjacent Exclusive OR elements. Furthermore each Exclusive OR, except for the first, has two inputs, each of which is determined by adjacent operand bits. Referring to FIG. 2, the first Exclusive OR has two identical inputs, one is the sign bit and the other is an internal bias equal to the sign bit. The Exclusive OR has an output only when the two inputs are different and consequently the Exclusive OR elements will indicate the first significant bit in positive or negative operands configured, respectively, in the format: 000000110101 ---, and 111111001011 ----. Since each Exclusive OR is associated with a specified input operand bits, the highest order Exclusive OR having an output signal represents the highest order operand bit which represents the bit position to which the operand will be normalized.

All of the Exclusive OR outputs are connected to portions of a logic tree which consists of a plurality of logic elements so interconnected as to produce a shift count output on data trunk 18 representative of the Exclusive OR associated with the most significant bit of the operand. One way of implementing this logic tree is shown in FIG. 2. There are, of course, other equivalent ways of producing the shift count output without deviating from the scope of the present invention.

The most basic logic tree (not the one shown in FIG. 2) is one which produces a shift count of 0 for an input of $2^0 = 1$ and $2^1$ through $2^{23} = 0$. This most general logic tree is described by the following material.

The logic tree in any configuration must produce a result determined by the boolean expressions which will be explained below. First the 24 bit operand is divided into six groups A, B, C, D, E and F each containing four bits of the operand. The A group contains the four highest valued bits in the operand while the F group contains the lowest four bits. The other groups are arranged in numerical order between A and F.

There are three types of conditions for each group which are indicated by subscripts with the letter denoting the group. A type 1 condition says all terms in a group are alike.

All terms in each group may be designated: $N_0$, $N_1$, $N_2$ and $N_3$ from the highest valued position to the lowest, respectively. A type 2 conditions says:

$1 = N_0\ N_1\ N_2$. A type 3 condition says:

$1 = N_0 + N_1$.

With the foregoing notational explanation the boolean expressions for a 1 in each bit position of the output of section 14 is:

For $2^0$ $$1 = A_2 + A_1\ B_2 + A_1\ B_1\ C_2 + A_1\ B_1\ C_1\ D_2 + A_1\ B_1\ C_1\ D_1\ E_2 + A_1\ B_1\ C_1\ D_1\ E_1\ F_2$$

For $2^1$ $$1 = A_3 + A_1\ B_3 + A_1\ B_1\ C_3 + A_1\ B_1\ C_1\ D_3 + A_1\ B_1\ C_1\ D_1\ E_3 + A_1\ B_1\ C_1\ D_1\ E_1\ F_3.$$

For $2^2$ $$1 = A_1 + B_1\ C_1 + B_1\ D_1\ E_1$$

For $2^3$ $$1 = A_1\ B_1\ C_1 + A_1\ B_1\ D_1$$

For $2^4$ $$1 = A_1 + B_1$$

It is also relatively easy to construct a logic tree which produces shift counts which have a positive or negative bias with respect to the shift count produced by the network just described, depending on the requirements of the overall computer architecture.

FIG. 2 illustrates a network which exhibits a bias of +2 with respect to the basic network. In other words, for an input of $2^0 = 1$ and $2^1$ through $2^{23} = 0$, it produces a shift count of 2 rather than 0.

Referring again to FIG. 1, it is obvious that in the full width mode, if the shift count is obtained from network 14, 24 must be added to the result before gating the shift count to register 28. This addition is wired into the network shown in FIG. 2. If connection 40 is a logical 1, the shift count 18 will be increased by 24 over the input operand to account for the fact that section 14 is the higher ordered section of the two sections. That is, this input makes the section aware that it is not working with a 24 bit operand but with bits $2^{24}$ through $2^{47}$ of a full width operand.

What is claimed is:

1. A normalize shift count network comprising:

means for receiving an unnormalized binary operand including an associated sign bit, a comparison means, connected with said means for receiving said operand, for comparing adjacent binary bits of said operand comprising a plurality of comparison networks, one of said networks comparing the sign bit of said operand with the highest order bit of said operand, each of said networks producing a first type of signal when said compared bits are alike and a second type of signal when said compared bits are different said comparison means producing an output signal indicative of the most significant operand bit, and a logic tree for producing a normalize shift count from said output signal.

2. A normalize shift count network for producing a shift count for an operand comprising:

means for comparing adjacent bits of an operand, said means comprising an operand input receiver and a plurality of comparison networks connected thereto, each of said networks being associated with a bit of said operand and another bit of said operand adjacent thereto, each of said networks producing a first output when compared adjacent bits are alike and a second output when compared adjacent bits are not alike, a logic tree, connected to said means, for producing the bits of the shift count operand dependent on the comparison network having an output indicative of the highest order adjacent operand bits which are not alike.

3. The apparatus of claim 2 in which said comparison networks are Exclusive OR logic elements.

4. The apparatus of claim 2 wherein said shift count network comprises a first and second section, each of said sections including an associated portion of said means for comparing and an associated portion of said logic tree for producing a shift count operand so that said apparatus may operate on either two one-half conventional width operands simultaneously by means of independent operation of said first and second sections or on one full width operand by means of joint operation of said first and second sections, interconnecting means connected between said first and second sections for operation in the full width mode for providing an input of operand bits to the portions of said comparison means associated with said first and second sections to compare adjacent operand bits dividing the sections and further comprising, means for selecting which of said sections contains the shift count in the full width mode by sensing whether or not the bits in the section associated with the highest ordered operand bits are all alike or not alike, said means for selecting generating an output signal responsive to the logic tree in the section producing the correct shift count operand.

* * * * *

UNITED STATES PATENT OFFICE

CERTIFICATE OF CORRECTION

Patent No. 3,831,012 Dated August 20, 1974

Inventor(s) Daniel J. Desmonds and Donald P. Tate

It is certified that error appears in the above-identified patent and that said Letters Patent are hereby corrected as shown below:

Column 3, line 45, for "SAME" read --"$\overline{\text{SAME}}$"--

Column 3, line 46, for "SAME"(second occurrence) read --"$\overline{\text{SAME}}$"--

Column 3, line 57, for "SAME" read --"$\overline{\text{SAME}}$"--

Column 4, line 14, for "AB + AB" read --$\overline{A}B + A\overline{B}$--

Column 4, line 16, for "(not A = A)" read --(not A = $\overline{A}$)

Column 5, line 11, for "$N_1$" read --$\overline{N}_1$--

Column 5, lines 16-29, for:

"For $2^0$ $1 = A_2 + A_1 B_2 + A_1 B_1 C_2$ $+ A_1 B_1 C_1 D_2 + A_1 B_1 C_1 D_1 E_2$ $+ A_1 B_1 C_1 D_1 E_1 F_2$

For $2^1$ $1 = A_3 + A_1 B_3 + A_1 B_1 C_3$ $+ A_1 B_1 C_1 D_3 + A_1 B_1 C_1 D_1 E_3$ $+ A_1 B_1 C_1 D_1 E_1 F_3$.

For $2^2$ $1 = A_1 + B_1 C_1 + B_1 D_1 E_1$

For $2^3$ $1 = A_1 B_1 C_1 + A_1 B_1 D_1$

ORM PO-1050 (10-69)

USCOMM-DC 60376-P69

☆ U.S. GOVERNMENT PRINTING OFFICE : 1969 O—366-334.

UNITED STATES PATENT OFFICE
CERTIFICATE OF CORRECTION

Patent No. 3,831,012 Dated September 3, 1974

Inventor(s) Daniel J. Desmonds and Donald P. Tate

It is certified that error appears in the above-identified patent and that said Letters Patent are hereby corrected as shown below:

For $2^4$ $1 = A_1 + B_1$" read:

--For $2^0$ $$1 = A_2 + \bar{A}_1 B_2 + \bar{A}_1 \bar{B}_1 C_2 + \bar{A}_1 \bar{B}_1 \bar{C}_1 D_2 + \bar{A}_1 \bar{B}_1 \bar{C}_1 \bar{D}_1 E_2 + \bar{A}_1 \bar{B}_1 \bar{C}_1 \bar{D}_1 \bar{E}_1 F_2$$

For $2^1$ $$1 = A_3 + \bar{A}_1 B_3 + \bar{A}_1 \bar{B}_1 C_3 + \bar{A}_1 \bar{B}_1 \bar{C}_1 D_3 + \bar{A}_1 \bar{B}_1 \bar{C}_1 \bar{D}_1 E_3 + \bar{A}_1 \bar{B}_1 \bar{C}_1 \bar{D}_1 \bar{E}_1 F_3 .$$

For $2^2$ $$1 = A_1 + \bar{B}_1 C_1 + \bar{B}_1 \bar{D}_1 E_1$$

For $2^3$ $$1 = A_1 B_1 \bar{C}_1 + A_1 B_1 \bar{D}_1$$

For $2^4$ $1 = \bar{A}_1 + \bar{B}_1$--

Signed and sealed this 26th day of November 1974.

(SEAL)
Attest:

McCOY M. GIBSON JR.
Attesting Officer

C. MARSHALL DANN
Commissioner of Patents

FORM PO-1050 (10-69)

USCOMM-DC 60376-P69
★ U.S. GOVERNMENT PRINTING OFFICE : 1969 O—366-334.

UNITED STATES PATENT OFFICE
CERTIFICATE OF CORRECTION

Patent No. 3,831,012  Dated August 20, 1974

Inventor(s) Daniel J. Desmonds, Donald P. Tate

It is certified that error appears in the above-identified patent and that said Letters Patent are hereby corrected as shown below:

This Certificate supersedes the Certificate of Correction issued November 26, 1974 with respect to the equations in column 5 at lines 16 through 29. The equations are to be corrected to read as follows:

For $2^0$ $$1 = A_2 + A_1B_2 + A_1B_1C_2 + A_1B_1C_1D_2 + A_1B_1C_1D_1E_2 + A_1B_1C_1D_1E_1F_2$$

For $2^1$ $$1 = A_3 + A_1B_3 + A_1B_1C_3 + A_1B_1C_1D_3 + A_1B_1C_1D_1E_3 + A_1B_1C_1D_1E_1F_3$$

For $2^2$ $$1 = \overline{A}_1 + B_1\overline{C}_1 + B_1D_1\overline{E}_1$$

For $2^3$ $$1 = A_1B_1\overline{C}_1 + A_1B_1\overline{D}_1$$

For $2^4$ $$1 = \overline{A}_1 + \overline{B}_1$$

Signed and Sealed this

*twenty-sixth* Day of *August 1975*

[SEAL]

*Attest:*

RUTH C. MASON
*Attesting Officer*

C. MARSHALL DANN
*Commissioner of Patents and Trademarks*